(12) United States Patent
Seaman et al.

(10) Patent No.: US 10,785,458 B2
(45) Date of Patent: Sep. 22, 2020

(54) METHOD AND SYSTEM FOR DISTRIBUTED CAMERA NETWORK

(71) Applicant: BlackBerry Limited, Waterloo (CA)

(72) Inventors: Conrad Delbert Seaman, Ottawa (CA); Ryan Michael Parker, Ottawa (CA); Stephen West, Manotick (CA)

(73) Assignee: BlackBerry Limited, Waterloo (CA)

( * ) Notice: Subject to any disclaimer, the term of this patent is extended or adjusted under 35 U.S.C. 154(b) by 188 days.

(21) Appl. No.: 15/468,898

(22) Filed: Mar. 24, 2017

(65) Prior Publication Data

US 2018/0278897 A1    Sep. 27, 2018

(51) Int. Cl.
*H04N 7/18* (2006.01)
*H04N 5/232* (2006.01)

(52) U.S. Cl.
CPC ......... *H04N 7/188* (2013.01); *H04N 5/23206* (2013.01); *H04N 7/181* (2013.01); *H04N 5/232061* (2018.08)

(58) Field of Classification Search
CPC .. G01S 3/7864; H04N 5/23206; H04N 7/188; H04N 7/181; H04N 5/772; H04N 5/23299; G06K 9/00771; G06K 2009/00738; G06K 2009/3291; G06K 2209/21; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06T 2207/30232; G06T 7/20; G06T 7/292; G06T 2207/30236; G06T 2207/30248; G06T 2207/30252; G06T 2207/30256; G06T 2207/30261; G06T 2207/30264; G06T 2207/30268; G08B 13/19613; G08B 13/19608; G08B 13/2491; G08B 13/19645; G08B 13/00; G08G 1/16; G08G 1/116; B60W 50/14; B60W 2050/143; B60W 2550/10; B60W 2550/14; B60R 2001/1215; B60R 1/00
USPC ........ 348/143, 148, 149, 153, 169; 382/103, 382/104, 115, 291
See application file for complete search history.

(56) References Cited

U.S. PATENT DOCUMENTS

| | | | |
|---|---|---|---|
| 6,476,858 | B1 | 11/2002 | Ramirez Diaz et al. |
| 7,339,607 | B2 | 3/2008 | Damabhorn |
| 8,531,521 | B2 * | 9/2013 | Romanowich ... G08B 13/19671 348/135 |
| 9,158,974 | B1 | 10/2015 | Laska et al. |
| 2005/0128291 | A1 * | 6/2005 | Murakami ............. H04N 7/181 348/143 |
| 2007/0064107 | A1 * | 3/2007 | Aggarwal ............. G01S 3/7864 348/143 |

(Continued)

OTHER PUBLICATIONS

International Searching Authority, International Search Report and Written Opinion of the International Searching Authority for International Application No. PCT/CA2018/050311, dated Jun. 21, 2018.

*Primary Examiner* — Nathnael Aynalem
(74) *Attorney, Agent, or Firm* — Moffat & Co

(57) ABSTRACT

A method at an image capture apparatus, the method including receiving, at the image capture apparatus, a trigger to begin image capture; based on the trigger, starting image capture for a fixed duration; and providing image capture data to a processing service.

17 Claims, 7 Drawing Sheets

(56) References Cited

U.S. PATENT DOCUMENTS

| | | | |
|---|---|---|---|
| 2007/0139192 A1* | 6/2007 | Wimberly | G08B 13/19656 340/539.22 |
| 2008/0094212 A1 | 4/2008 | Breed | |
| 2009/0201143 A1 | 8/2009 | McKeena et al. | |
| 2009/0231189 A1 | 9/2009 | Reddy et al. | |
| 2009/0315699 A1 | 12/2009 | Satish et al. | |
| 2013/0033381 A1* | 2/2013 | Breed | B60T 1/005 340/568.1 |
| 2013/0342333 A1* | 12/2013 | Hutchings | H04N 7/18 340/435 |
| 2014/0328578 A1* | 11/2014 | Shafron | H04N 21/63 386/328 |
| 2014/0375807 A1 | 12/2014 | Muetzel et al. | |
| 2016/0050356 A1 | 2/2016 | Nalepka et al. | |
| 2016/0292511 A1* | 10/2016 | Ayalasomayajula | G06K 9/00751 |
| 2017/0272450 A1* | 9/2017 | Krishnamurthi | H04L 63/1416 |
| 2018/0091741 A1* | 3/2018 | Ida | G06K 9/00711 |

\* cited by examiner

METHOD AND SYSTEM FOR DISTRIBUTED CAMERA NETWORK

FIELD OF THE DISCLOSURE

The present disclosure relates to security systems, and in particular relates to security systems having dynamic camera placement.

BACKGROUND

In many areas, closed circuit video surveillance systems may be inefficient. For example, in shipping yards, trailer yards, rail yards or other similar storage facilities, the size and dynamic nature of the storage area may cause the use of closed circuit camera systems to be inefficient and unsecure. In particular, these yards have several problems for traditional security systems. The yards may be massive, covering many acres of land. To outfit this with a closed-circuit television surveillance system would take massive investment and hundreds of cameras just to capture some of the area. In many cases, typical yards only install a few cameras, but having a limited number of cameras for such a large area makes it unlikely to capture enough detail of any potential incident to make the installation of the cameras worthwhile.

Further, in yards such as rail yards, trailer yards, or shipping yards, the entrances or exits are vague. It would be very easy for criminals to enter from just about any direction. Thus, positioning the limited number of cameras at entry or exit points is not very effective, since many events may be missed. Due to the size of such storage yards, a criminal may also easily hide from single point cameras by simply approaching from other directions.

Yards may also shift over time. They may overflow into adjacent areas, fields or parking lots. They may shrink. Yards may grow up or out. They may "move" with time, for example lanes/alleys, parking locations may drift, making static mounting points for cameras and security challenging.

In other examples, the use of fixed position cameras may be expensive or logistically problematic. It may be difficult or expensive to run power and video cables to cameras. Conditions around a camera location may also change over time, resulting in a need to move such cameras. Therefore, in many cases static camera networks can be challenging.

BRIEF DESCRIPTION OF THE DRAWINGS

The present disclosure will be better understood with reference to the drawings, in which.

DETAILED DESCRIPTION

The present disclosure provides a method at an image capture apparatus, the method comprising: receiving, at the image capture apparatus, a trigger to begin image capture; based on the trigger, starting image capture for a fixed duration; and providing image capture data to a processing service.

The present disclosure further provides an image capture apparatus comprising: a processor; a communications subsystem; and at least one sensor for capturing images, wherein the image capture apparatus is configured to: receive, at the image capture apparatus, a trigger to begin image capture; based on the trigger, start image capture for a fixed duration; and provide image capture data to a processing service.

The present disclosure further provides a computer readable medium for storing program instructions, which, when executed by a processor of an image capture apparatus, cause the image capture apparatus to: receive, at the image capture apparatus, a trigger to begin image capture; based on the trigger, start image capture for a fixed duration; and provide image capture data.

The embodiments of the present disclosure are described below using the environment of a storage yard as an example. However, the present disclosure is not limited to use within such storage yards, and the embodiments can be used in other scenarios, such as for securing a home or business, providing security temporarily in a location, or providing security in an outdoor venue or location, among other options.

As indicated above, storage yards such as rail yards, trailer yards, shipping yards, among other locations may be difficult to secure. Further, other areas associated with the transportation of goods, including truck stops, warehousing locations among others may also be difficult to secure.

Figure 1:
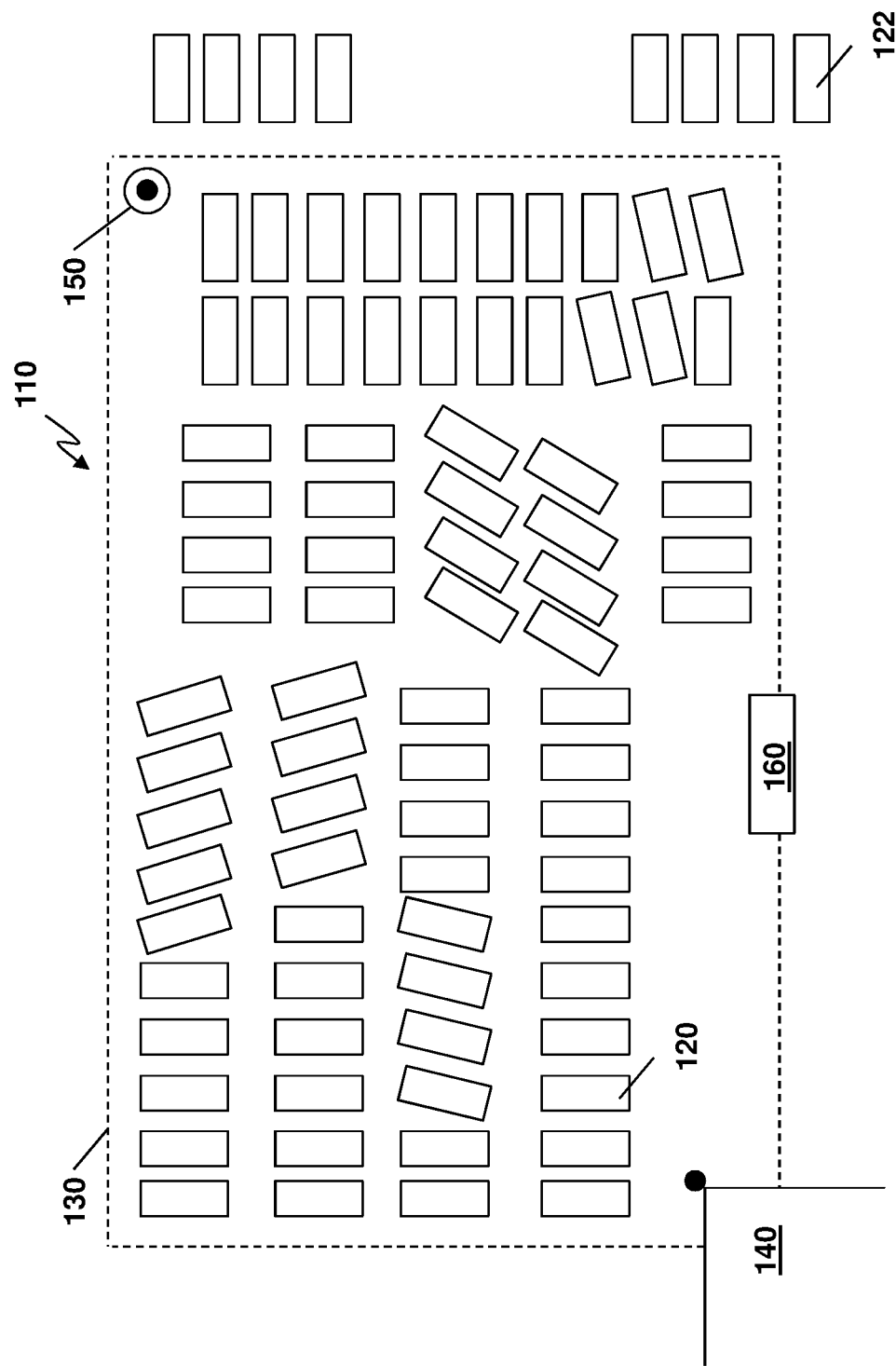
FIG. 1 is a block diagram of an example storage yard and the components therein.

For example, reference is made to FIG. 1. FIG. 1 shows a simplified environment of a storage yard 110. Storage yard 110 includes a plurality of shipping containers 120. In some cases, the shipping containers 120 may be within a fenced area 130. However, due to the dynamic nature of the shipping yard, some containers, shown with reference 122, are outside of the fenced area 130. Further, in many cases storage yard 110 may simply be too big to have a fenced area 130.

Fixed infrastructure points within the storage yard 110 may exist. For example, a building 140 or a fixed structure 150 such as a lamppost, security pole, or crane, among other options, may exist within the storage yard 110.

Under traditional security models, cameras may be affixed within the storage yard 110. For example, they may be affixed to building 140 or fixed structure 150.

Further, an entrance point 160 may also have cameras and/or security personnel located therein.

However, a thief may easily circumvent such security by breaching the fence 130 and entering the yard. Due to the size of typical yards, this may be a relatively straightforward process. A thief may easily circumvent fixed cameras such as those on building 140 or fixed structure 150, and even if some images from these cameras capture the thief, the limited number of images may not provide enough detail or resolution to identify the thief, goods being taken, or other similar information.

Therefore, in accordance with one embodiment of the present disclosure, a dynamic and distributed image capture system is provided. In particular, in one embodiment, a subset of containers 120 or 122 may have associated there-with an image capture apparatus that can be triggered to start or stop capturing images and communicate the results to a centralized server.

Such image capture apparatus may, in some embodiments, be a power limited device, such as a battery-operated device, to allow the system to be deployed without a fixed power supply. However, because the image capture device is power limited, it cannot continuously capture images without quickly draining the battery or otherwise taxing the power source.

In one embodiment, the image capture apparatus uses fleet management tracking devices on the shipping containers 120 or 122. Specifically, in many instances shipping containers or truck trailers are equipped with sensors that may have communication capabilities and provide information about such shipping container or trailer. For example, the sensors may provide temperature readings, location readings through a positioning system such as the global positioning system (GPS), vibration sensors, accelerometers, gyroscopes, among other sensor information.

In one embodiment of the present disclosure, an image sensor apparatus, such as a camera may be added to such tracking device. In a further embodiment, an image capture apparatus may be provided as a standalone solution, outside of any tracking system.

Figure 2:
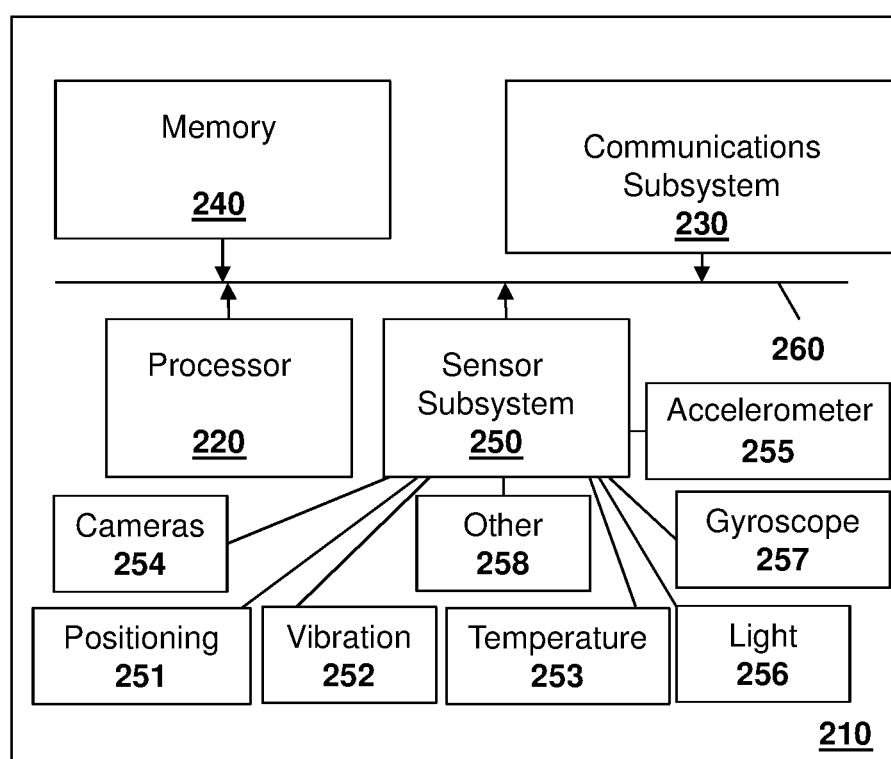
FIG. 2 is a block diagram of an example image sensor apparatus.

Reference is now made to FIG. 2, which shows an example image sensor apparatus 210. Image sensor apparatus can be any computing device or network node. Such computing device or network node may include any type of electronic device, including but not limited to, mobile devices such as smartphones or cellular telephones. Examples can further include fixed or mobile devices, such as internet of things devices, endpoints, home automation devices, medical equipment in hospital or home environments, inventory tracking devices, environmental monitoring devices, energy management devices, infrastructure management devices, vehicles or devices for vehicles, fixed electronic devices, among others.

Image sensor apparatus 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows device 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), near field communications (NFC), Zigbee, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP). As will be apparent to those skilled in the field of communications, the particular design of the communication subsystem 230 will be dependent upon the communication network or communication technology on which the image sensor apparatus is intended to operate.

Processor 220 generally controls the overall operation of the image capture device 210 and is configured to execute programmable logic, which may be stored, along with data, using memory 240. Memory 240 can be any tangible, non-transitory computer readable storage medium, including but not limited to optical (e.g., CD, DVD, etc.), magnetic (e.g., tape), flash drive, hard drive, or other memory known in the art.

Alternatively, or in addition to memory 240, image sensor apparatus 210 may access data or programmable logic from an external storage medium, for example through communications subsystem 230.

In the embodiment of FIG. 2, image sensor apparatus 210 may utilize a plurality of sensors, which may either be part of image sensor apparatus 210 in some embodiments or may communicate with sensor apparatus 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors 254, accelerometer 255, light sensors 256, gyroscopic sensors 257, and other sensors 258. Other sensors may be any sensor that is capable of reading or obtaining data that may be useful for image sensor apparatus 210. However, the sensors shown in the embodiment of FIG. 2 are merely examples, and in other embodiments different sensors or a subset of sensors shown in FIG. 2 may be used.

Communications between the various elements of image sensor apparatus 210 may be through an internal bus 260 in one embodiment. However, other forms of communication are possible.

Image sensor apparatus 210 may be affixed to any fixed or portable platform. For example, image sensor apparatus 210 may be affixed to shipping containers, truck trailers, truck cabs in one embodiment. In other embodiments, image sensor apparatus 210 may be affixed to any vehicle, including motor vehicles (e.g., automobiles, cars, trucks, buses, motorcycles, etc.), aircraft (e.g., airplanes, unmanned aerial vehicles, unmanned aircraft systems, drones, helicopters, etc.), spacecraft (e.g., spaceplanes, space shuttles, space capsules, space stations, satellites, etc.), watercraft (e.g., ships, boats, hovercraft, submarines, etc.), railed vehicles (e.g., trains and trams, etc.), and other types of vehicles including any combinations of any of the foregoing, whether currently existing or after arising, among others.

In other cases, image sensor apparatus 210 could be carried by a user.

In other cases, sensor apparatus 210 may be affixed to stationary objects including buildings, lamp posts, fences, cranes, among other options.

Such sensor apparatus 210 may be a power limited device. For example image sensor apparatus 210 could be a battery operated device that can be affixed to a shipping container or trailer in some embodiments. Other limited power sources could include any limited power supply, such as a small generator or dynamo, a fuel cell, solar power, among other options.

In other embodiments, sensor apparatus 210 may utilize external power, for example from the engine of a tractor pulling the trailer, from a land power source for example on a plugged in recreational vehicle or from a building power supply, among other options.

External power may further allow for recharging of batteries to allow the sensor apparatus 210 to then operate in a power limited mode again. Further, recharging methods may also include other power sources, such as, but not limited to, solar, electromagnetic, acoustic, or vibration charging.

Referring again to FIG. 1, if the sensor apparatus 210 from FIG. 2 is affixed to a plurality of the shipping containers 120 then a dynamic security network may be created as described below. Specifically, assuming that the image sensor apparatus 210 is installed on a number of cargo containers or shipping containers, then even at low penetration rates a given yard may have a number of cameras. For example, even at penetration rates of 1%, 5% or 10%, a yard that has a hundred or a thousand shipping containers will have many cameras that are available for providing security.

Due to the nature of the storage yard 110, the cameras would likely be distributed around the yard. Further, since shipping containers may be stacked or parallel or perpendicular or at other angles to each other, the image capture mechanism may provide various angles to allow for a comprehensive security solution, as described below.

Figure 3:
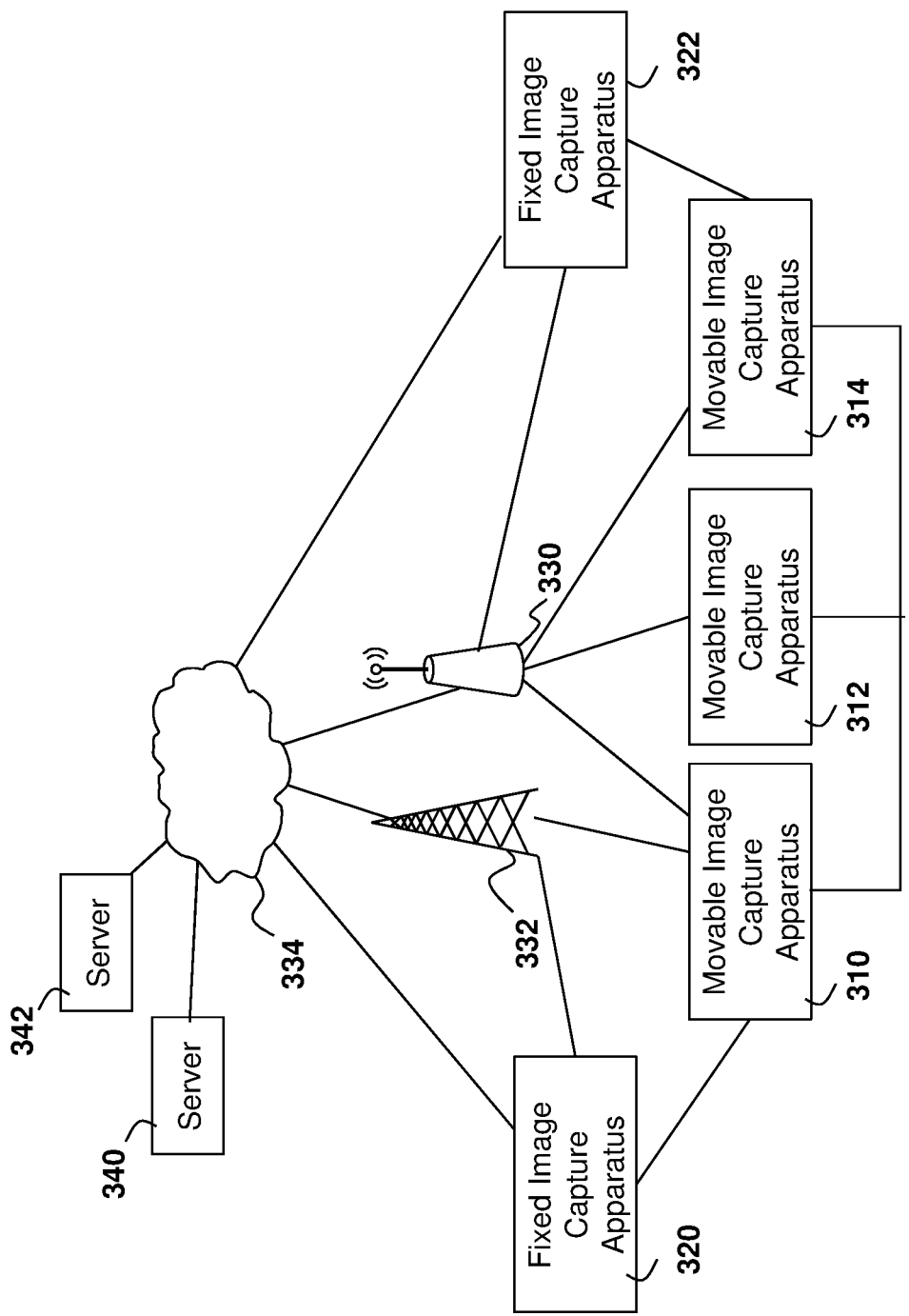
FIG. 3 is a block diagram of an example architecture for some embodiments of the present disclosure showing a plurality of sensor apparatus.

Reference is now made to FIG. 3. which shows one example architecture that may be utilized in accordance with the present disclosure. In particular, the example architecture of FIG. 3 has three movable image sensor apparatuses, namely image sensor apparatus 310, image sensor apparatus 312, and image sensor apparatus 314.

Further, a plurality of fixed image sensor apparatus may exist within the network in some embodiments. These are shown, for example, as fixed sensor apparatus 320 and fixed sensor apparatus 322.

In the embodiment of FIG. 3, the movable sensor apparatuses 310, 312 and 314 communicate through an access point 330 or base station 332, and thereby can communicate over a wide area network such as the Internet 334. In other embodiments, the movable sensor apparatuses 310, 312 and 314 may communicate through other mechanisms over Internet 334, such as a fixed connection or any other wired or wireless communications.

Further, fixed sensor apparatus 320 and fixed sensor apparatus 322 may communicate with access point 330 or base station 332 in some embodiments. In other embodiments, the fixed sensor apparatus 320 and/or fixed sensor apparatus 322 may communicate through other mechanisms over Internet 334, such as a fixed connection or any other wired or wireless communications.

While the embodiment of FIG. 3 only shows one access point 330, in other embodiments a plurality of access points may be provided within an area that is to be secured.

Further, the information from any of sensor apparatus 310, 312, 314, 320 and 322 may be provided to one or more servers 340 or 342. For example, if the sensor apparatus 310 and 312 belong to a first company, such apparatus may communicate with a first company's server 340. Sensor apparatus 314 may belong to a second company and may therefore communicate with a second company's server 342.

In other embodiments, a single company may have a plurality of servers. A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of movable image capture apparatuses 310, 212, 314, etc. For example, the server may be located essentially anywhere so long as it has network access (e.g., 334) to communicate with image capture apparatuses 310, 212, 314, etc.

In accordance with one embodiment of the present disclosure, the various fixed or mobile apparatuses may also communicate with each other. Thus, apparatus 310 may communicate directly with apparatus 312 or apparatus 314 in some embodiments. Further, apparatus 310 may communicate with fixed apparatus 320 or 322 in some embodiments.

Further, the owners of the servers 340 and 342 may have agreements to allow communication between such servers for use in security applications.

The example architecture of FIG. 3 is merely provided for illustration purposes and is not limiting to any particular apparatus or architecture. For example, in some cases apparatus 310 may only be able to communicate with apparatus 312 since they are owned by the same company. In other cases, apparatus 310 could communicate with apparatus 314 if there is an agreement for security purposes. In other cases, apparatus 310 may not be able to communicate directly with apparatus 322 since the distance between the two may be too far to allow for such communications.

In other cases, apparatus 310 may be out of range of access point 330 and may therefore utilize another apparatus such as apparatus 312 as a relay for providing information to server 340.

As described above, in many cases, an image sensor apparatus may be a limited power device. For example, the device may operate using a battery. Because of the limited power, the image sensor apparatus does not continually capture images. Continual image capture would drain the battery far too quickly and provide information which may not be relevant most the time. Thus, in accordance with the embodiments described herein, a sensor apparatus may act based on a trigger.

Figure 4:
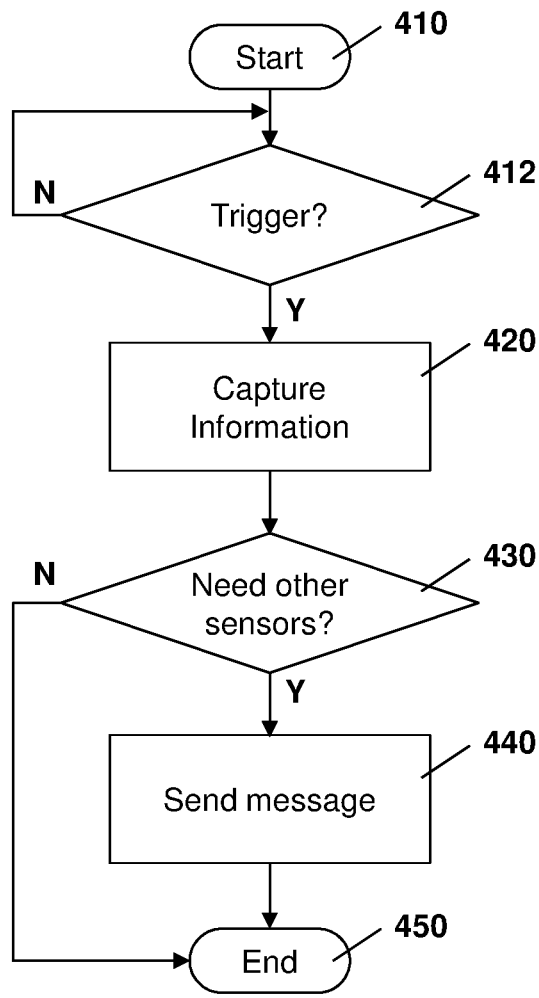
FIG. 4 is a process diagram showing a process for triggering image capture and determining whether to relay the trigger.

In particular, reference is now made to FIG. 4, which shows a process for image capture by a sensor apparatus 210.

The process of FIG. 4 starts at block 410 and proceeds to block 412, in which a check is made to determine whether a trigger has been received. The trigger at block 412 may be any trigger that the processor of sensor apparatus 210 deems to be a reason to start capturing information.

For example, if the sensor apparatus 210 is affixed to the rear of a trailer, then a door status sensor associated with sensor apparatus 210 may be provided to detect when a door of the trailer is opened. In such case, the door opening event may trigger the sensor apparatus to start recording information.

In other cases, vibration sensors may indicate that someone has entered or left the trailer.

In other cases, motion sensors may detect motion near the vicinity of the sensor apparatus.

In other cases, heat sensors may detect the presence of a person or anomaly within or outside of the trailer.

Other examples are possible.

Further, in some cases, the trigger at block 412 could be a signal from another transmitter. Such transmitter may, for example, be a centralized location or monitoring station which is directing the sensor apparatus to wake up.

The trigger may also be a signal from another nearby sensor apparatus indicating that there may be an issue and sensors in the vicinity should wake up.

In some embodiments, the trigger may be dependent on location. For example, the sensor apparatus 210 may not start to monitor for triggers until it enters a particular area or geofence. Thus, in accordance with one embodiment, the process of FIG. 4 would be avoided until the apparatus enters an area where image capture may be needed. Once sensor apparatus 210 enters the particular area, it can start to listen for triggers, whether they are from local sensors such as the vibration or door opening sensors, or whether they are from other transmitters.

The present disclosure is not limited to any particular trigger.

From block 412 the process proceeds to block 420 in which image capture may occur. Such image capture may be continuous in some embodiments. For example, the trigger event may indicate to the processor to start capturing continuous video for the next five minutes. The captured information may be conveyed to a central server in some embodiments to alert security and to provide information to security. In other embodiments the captured information may be stored on the image sensor apparatus for later processing.

Other examples may include capturing a periodic image for a time duration. Specifically, the processor may cause a camera to take a picture every second for the next three minutes. Duration may also indicate a single picture being taken, a series of photos being taken periodically at a predetermined time between shots, a continuous series of photos, or pictures being taken by a profile that may include irregular sampling times.

In other cases, the image capture may continue until the sensor apparatus 210 is told to stop capturing images.

Other examples would be apparent to those skilled in the art.

From block 420, the process proceeds to block 430 in which a check is made to determine whether or not any other sensor apparatus is needed to capture images. In particular, depending on the original trigger event at block 412, it may be desirable to capture images from a nearby sensor apparatus as well as the current sensor apparatus.

For example, if the trailer detects a door opening event that is unexpected, then the sensor apparatus on the trailer may ask nearby trailers to start taking pictures to capture images of the person that opened the trailer. By employing nearby trailers, the likelihood of obtaining a good quality picture of the person that opened the trailer door is enhanced by a covering various egress routes and allowing for different lighting conditions within the trailer yard.

If, as determined at block 430, other sensors need to be woken, then the process proceeds to block 440 in which a message is sent. Such message at block 440 may either be sent to a central controller which could then activate other sensors within the vicinity of the triggered sensor. For example, a sensor apparatus may periodically report to a central server to indicate its status and location. Such location could then be used to find image sensors apparatuses within a radius, or predefined distance, of the original trigger event. Moreover, the radius or distance may be defined by a geofence or other spatial definition that could project only from a particular range of direction from the sensor apparatuses (e.g, where the camera has a view such as the back of the trailer and somewhat to the sides depending on the lens configuration). Examples may include a wedge shape, circle, rectangle, square, or the distance may be irregular.

Alternatively, the message at block 440 may be sent directly to the other sensor apparatuses in the nearby vicinity.

From block 440, the process may proceed to block 450 and end.

Further, from block 430, if other sensors do not need to be informed of the event then the process proceeds to block 450 and ends.

Figure 5:
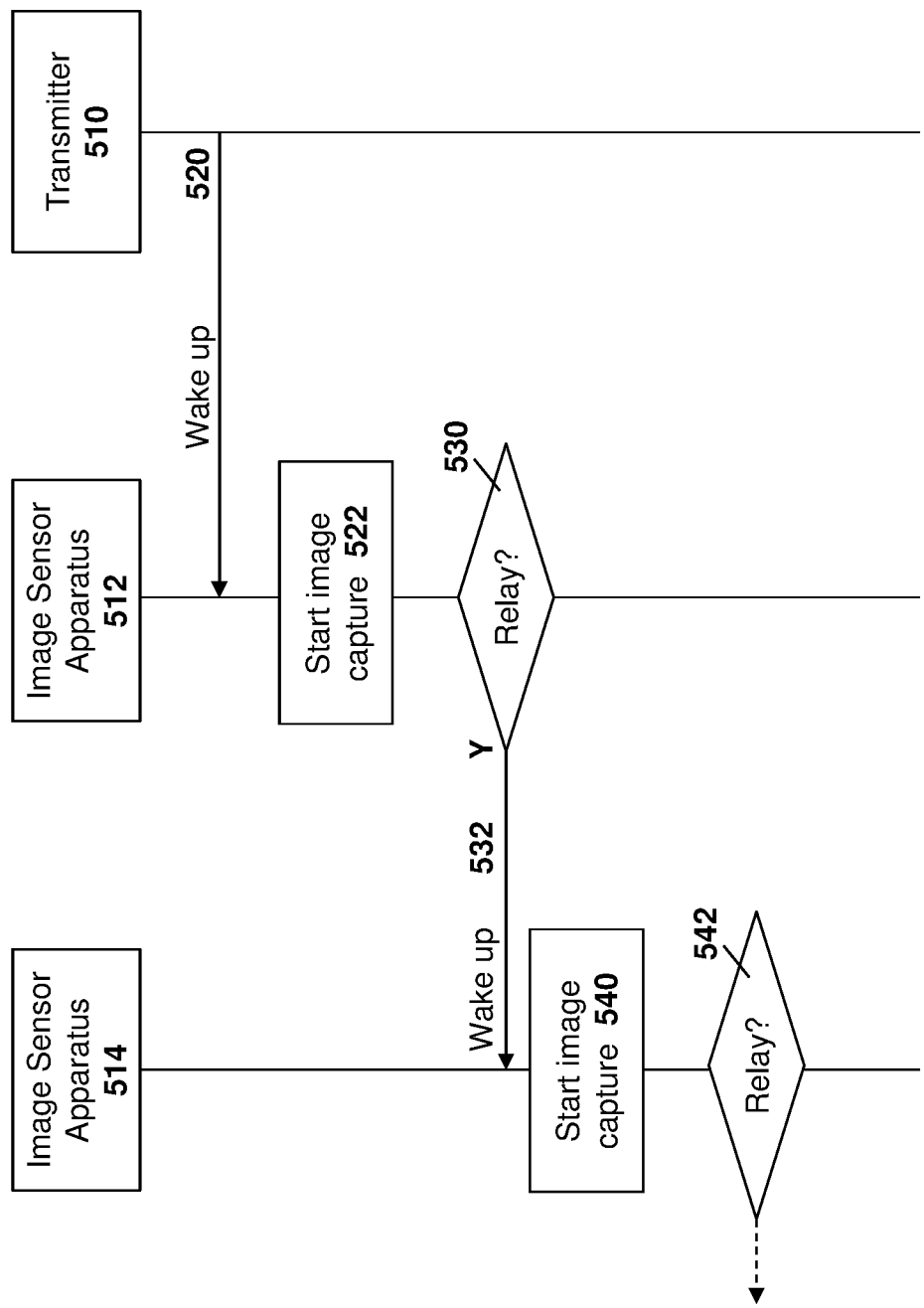
FIG. 5 is a data flow diagram showing the relaying of triggers for starting image capture.

An example of messages that may be sent between devices is provided with regard to the embodiment of FIG. 5. In particular, in the embodiment of FIG. 5, a transmitter 510 may be the device that receives the alert or may be a centralized controller for the security system, acting through an access point. Transmitter 510 communicates with a first device 512. Device 512 may be a fixed or mobile image sensor apparatus.

In the embodiment of FIG. 5, transmitter 510 sends image sensor apparatus 512 a wake-up trigger 520. Wake up trigger 520 may provide a trigger to device 512 to start capturing images. The capturing of images is shown by block 522.

Further, apparatus 512 may need to relay the message 522 to other apparatuses within the vicinity in some embodiments. This is shown, for example, by decision block 530 which checks whether to relay the information.

If the apparatus 512 needs to relay the information, as determined at block 530, then a wake-up trigger 532 may be provided to a second image capture apparatus 514.

Again, image capture apparatus 514 receives wake-up trigger 532 and may start capturing images, shown by block 540. Apparatus 514 may similarly decide whether to relay the wake-up trigger, as shown by block 542.

The contents of wake-up trigger 520 may depend on the particular scenario or deployment situation. However, one example of information that may be contained in wake up trigger 520 is provided in Table 1 below.

TABLE 1

| Example wake-up trigger |
| --- |
| Event ID |
| Device ID |
| Position |
| Range |
| Alert Type |
| Server for reporting |
| Time of event |
| Duration of capture |
| Report time |

As seen in Table 1 above, the wake-up trigger may include various information. Example information may include an event identifier to allow for the unique identification of a particular event and to allow a server or centralized controller to stitch various captured images from the event together. The event identifier may, for example, be part of a device identifier along with a number that may be incremented by the apparatus. For example, if a first sensor detects the event, it may store its own device identifier along with a sequence number that may be appended to the device identifier to provide an event ID. Other examples of providing unique event identifiers would be apparent to those skilled in the art.

The wake up trigger of Table 1 above may further include a device identifier for the device that originated the trigger in some embodiments.

The wake-up trigger 520 may further include the position of the apparatus that activated the trigger. For example, on portable devices, this may be determined through a position acquisition system such as a GPS system. In other embodiments, the position may be based on the access point or networks that the device can see. Other options for positioning are possible.

In some embodiments, wake up trigger 520 may include a range. This may be used, for example, to ask apparatuses within a particular range of the original apparatus that initiated the trigger to wake up. Such other apparatuses would therefore utilize their own position information and to determine whether they are within the range of the original apparatus' position in order to start capturing images or not.

In some cases, the event or alert types may be provided in wake up trigger 520. Thus, various events may cause different behavior among various apparatuses and the determination of whether to activate image capture may partially depend on the alert type provided in wake-up message 520 in some embodiments.

Further, wake up message 520 may include information such as which server to report the captured image to. For example, if a plurality of sensor owners have trailers within a shipping yard, then the images may be desired at a single server in order to allow for the security to correctly capture and mesh all of the images together.

In some embodiments, trigger 520 may include a time that the event occurred and a duration for reporting.

In some embodiments, trigger 520 may provide a timeslot that a particular device should use for communicating captured images. This may be used, for example, to avoid collisions in communications from the various image sensor apparatuses.

In other embodiments, more or less information than that shown in Table could be provided between devices or between servers and devices. The example wake-up trigger in Table 1 above is therefore only provided for illustration purposes.

Once the images are captured, they may be reported to a server. For example, Table 2 provides information that may be provided to a server.

TABLE 2

Example image capture data

Event ID
Device ID
Position of Capturing device
Bearing of image capture device
Image data From Table 2 above, each image capture apparatus may convey image data to a server. The message with the image data may include various information.

For example, from Table 2 above, the message may include the event identifier that was either created at the image capture device or was received as a trigger at the image capture device.

The message may further include a unique device identifier in some embodiments.

The message may further include the position of the image sensor apparatus that captured the images. As the image sensor apparatus may be movable, such information allows the receiving server to pinpoint the location that the image data was captured.

The message may further include a bearing indicating the direction in which the camera or image capture device was pointing. Specifically, the bearing may be known from an internal compass type sensor on the image capture apparatus, or may be known from image processing on the captured images when compared to a database, among other options. The bearing may indicate the direction in which the camera is pointing to allow images to be stitched together.

Further if the image capture device has multiple cameras, image data from the different cameras can be separated and the bearings for each camera provided. Thus, for example, if a trailer mounted sensor has a camera pointed into the trailer and one pointed behind the trailer, image data from both may be conveyed to the server, where image data pointing into the trailer is distinguished in the message from image data from behind the trailer.

By receiving multiple messages such as those provided in Table 2, a server can stitch together the information to create a profile for an event.

Based on the above, a dynamic security network that can be activated by a central controller such as a yard manager, or may activate automatically when a problem is detected, is created.

For example, a robber enters a yard with 1000 trailers. Assume 100 these trailers have a sensor apparatus 210 installed. This means that that there are 100 different angles and points of security inside a medium-sized shipping yard. By coordinating such security, the yard is provided with a relatively low cost and highly effective security network.

For example, in one embodiment, a yard worker may detect a threat and could ask all 100 trailers to take pictures or record a short video using a command console at a central location.

In another embodiment, an event such as a vibration or a door opening for a container may trigger a single device to take pictures or videos of what is happening. The situation made then be escalated to ask that pictures be taken by other devices within the nearby vicinity.

In another embodiment, the detection of the event by one device leads to an alert which wakes up all devices within a defined radius to take photos or videos. For example, such radius may be defined in meters, yards or kilometers or miles. In other embodiments the radius may be the communications range of the trigger signal.

In another embodiment, photos may be taken from outside the container to detect the actors involved.

In other embodiments, the photos or images may be taken inside a container to detect what is occurring inside the container, what goods are being taken, what is being moved, among other options.

In a further embodiment, photos or images may be taken and then uploaded to a server and the server may then stitch together the photos or videos. For example, this may be done through a unique identifier in some embodiments. The photos or videos that are uploaded to the server may further include other information, including GPS or compass directions and therefore the meshing of the images may create a virtual crime scene from many angles.

Figure 6:
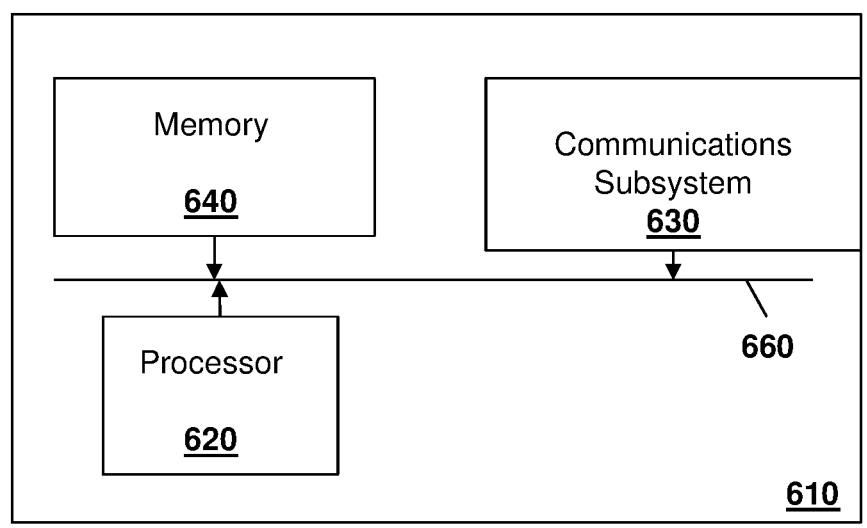
FIG. 6 is a block diagram of a simplified computing device capable of performing the embodiments of the present disclosure.

For example, one simplified server that may perform the stitching is provided with regards to FIG. 6.

In FIG. 6, server 610 includes a processor 620 and a communications subsystem 630, where the processor 620 and communications subsystem 630 cooperate to perform the methods of the embodiments described herein.

Processor 620 is configured to execute programmable logic, which may be stored, along with data, on server 610, and shown in the example of FIG. 6 as memory 640. Memory 640 can be any tangible, non-transitory computer readable storage medium, such as optical (e.g., CD, DVD, etc.), magnetic (e.g., tape), flash drive, hard drive, or other memory known in the art.

Alternatively, or in addition to memory 640, server 610 may access data or programmable logic from an external storage medium, for example through communications subsystem 630.

Communications subsystem 630 allows server 610 to communicate with other devices or network elements.

Communications between the various elements of server 610 may be through an internal bus 660 in one embodiment. However, other forms of communication are possible.

Figure 7:
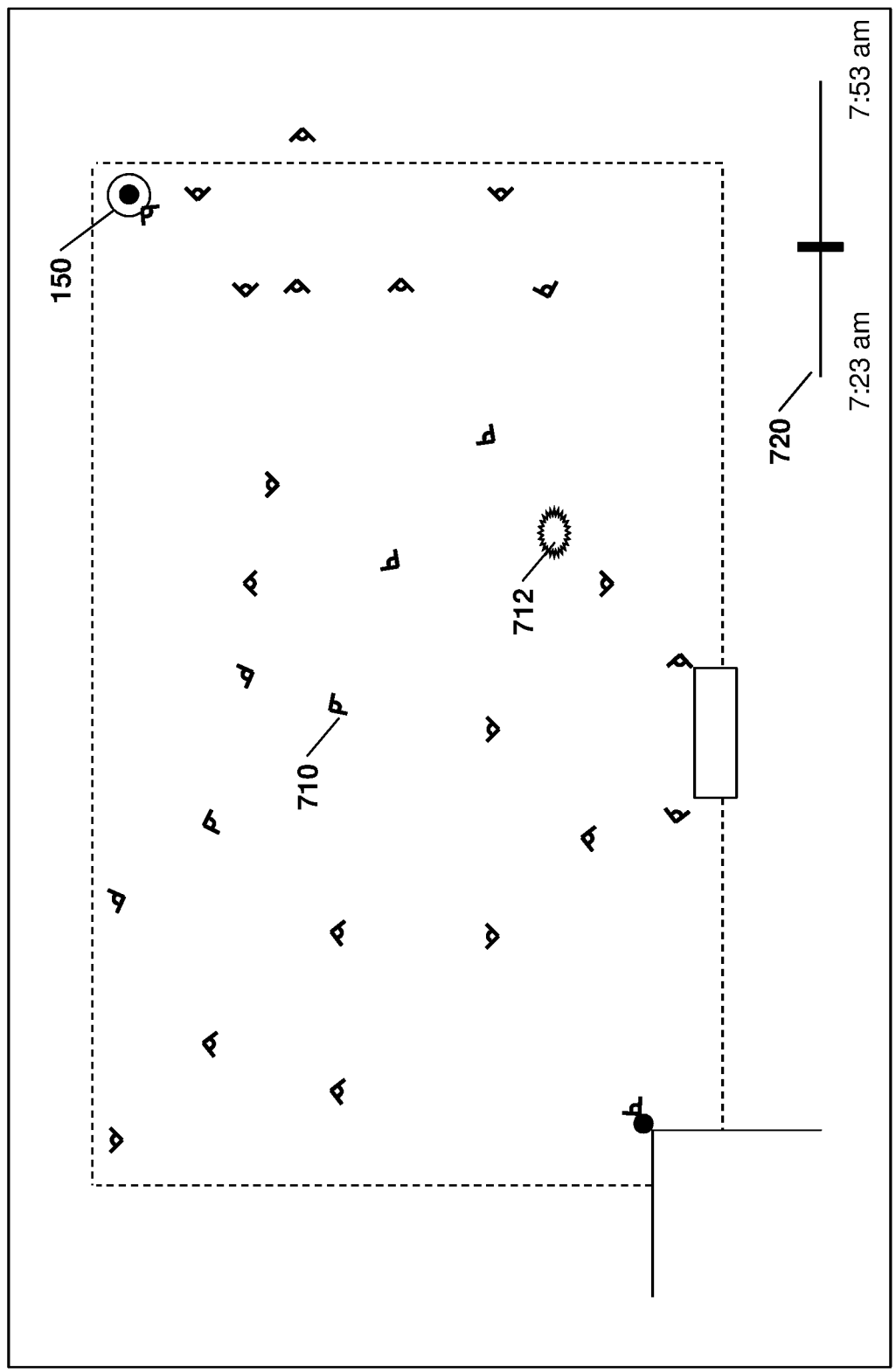
FIG. 7 is an example user interface showing image data stitched together on a map.

Server 610 may compile all image data related to an event or for a particular location during a time interval, and display such data, for example on an interactive map. For example, image data may include a location for the data, and may further include an orientation for the image capture. Such data may then be placed on a map. Reference is now made to FIG. 7.

In the embodiment of FIG. 7, a map may include, for example, an image of fixed structures of a storage yard. The map may further include icons 710 that can be used to display captured images. In one embodiment the orientation of the icon could represent the orientation of the image capture device. In some embodiments, the trigger site might be shown with a special icon 712.

In some cases, a time bar 720 which may allow icons 710 to appear or disappear depending on whether images were being captured during the time interval indicated by the time bar.

Other options for stitching the image data together are possible. For example, in one embodiment the actual image that was captured may be displayed on the map, and images may change as the time bar is moved.

While the above describes a storage yard such as a trailer yard or rail yard, in other embodiments the above disclosure could be utilized in the world at large. In this case, the sensor apparatus may become part of a mobile surveillance device. It could therefore be utilized by others to capture areas of interest. For example, in some cases, law enforcement may activate image sensor apparatuses within a predetermined area in order to capture images. For example, this may be activated during a bank robbery in order to try to determine the direction that the bank robbers left, capture the license plate of the bank robber or capture images of the faces of the bank robbers. Other examples are possible.

The embodiments described herein solve various issues. Specifically, the embodiments provide a low-cost solution since the image sensor apparatuses may already be part of containers, on vehicles or in other fixed situations. In the shipping yard example, the yard is typically covered relatively well since such shipping containers tend to get randomly distributed.

The embodiments described may provide image capture for various angles for a crime scene, increasing chances of seeing a face or providing more details with regard to the event.

The use of many devices would provide investigators with more details. Further, the use of sensing apparatus may not be obvious to robbers or other actors since they form part of the infrastructure.

Also, in some embodiments, the security system shifts as the storage yard shifts.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes, Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a first image capture apparatus, the method comprising:
receiving, at the first image capture apparatus, from a second image capture apparatus a trigger to begin image capture, wherein the trigger includes a field indicating a range around the second image capture apparatus for which image capture data is needed and a location of the second image capture apparatus;
determining, by the first image capture apparatus, its location;
finding, by the first image capture apparatus, whether the first image capture apparatus is within the range around the second image capture apparatus based on the location of the second image capture apparatus;
if the first image capture apparatus is within the range, starting the image capture; and
providing image capture data to a processing service.

2. The method of claim 1, wherein the trigger includes one or more information elements selected from: an event identifier; a device identifier for the second image capture apparatus; a position of the second image capture apparatus; an alert type; an endpoint to report information to; a time of an event; the fixed duration; or a report timeslot.

3. The method of claim 1, wherein the providing the image capture data to the processing service further includes providing at least one information item selected from: a device identifier for the first image capture apparatus; an event identifier; a position of the first image capture apparatus; and a bearing for an image sensor on the first image capture apparatus.

4. The method of claim 1, further comprising:
determining whether to relay the trigger to another image capture apparatus; and
if the trigger should be relayed, sending the trigger to the another image capture apparatus.

5. The method of claim 4, wherein the another image capture apparatus is within a predetermined distance of the first image capture apparatus.

6. The method of claim 1, wherein the first image capture apparatus is affixed to a trailer or shipping container as part of a fleet management system.

7. The method of claim 1, wherein the first image capture apparatus further reports a location of the first image capture apparatus to the processing service.

8. The method of claim 7, wherein the trigger is received based on the reported location of the first image capture apparatus.

9. A first image capture apparatus comprising:
a processor;
a communications subsystem; and
at least one sensor for capturing images,
wherein the first image capture apparatus is configured to:
receive, at the first image capture apparatus, from a second image capture apparatus a trigger to begin image capture, wherein the trigger includes a field indicating a range around the second image capture apparatus for which image capture data is needed and a location of the second image capture apparatus;
determine, by the first image capture apparatus, its location;
find, by the first image capture apparatus, whether the first image capture apparatus is within the range around the second image capture apparatus based on the location of the second image capture apparatus;
if the first image capture apparatus is within the range, start the image capture; and
provide image capture data to a processing service.

10. The first image capture apparatus of claim 9, wherein the trigger includes one or more information elements selected from: an event identifier; a device identifier for the second image capture apparatus; a position of the second image capture apparatus; an alert type; an endpoint to report information to; a time of an event; the fixed duration; or a report timeslot.

11. The first image capture apparatus of claim 9, wherein the first image capture apparatus is further configured to provide the image capture data to the processing service by providing at least one information item selected from: a device identifier for the first image capture apparatus; an event identifier; a position of the first image capture apparatus; and a bearing for an image sensor on the first image capture apparatus.

12. The first image capture apparatus of claim 9, wherein the first image capture apparatus is further configured to:
determine whether the trigger needs to be relayed to another image capture apparatus; and
if the trigger needs to be relayed, send the trigger to the another image capture apparatus.

13. The first image capture apparatus of claim 12, wherein the another image capture apparatus is within a predetermined distance of the first image capture apparatus.

14. The first image capture apparatus of claim 9, wherein the first image capture apparatus is affixed to a trailer or shipping container as part of a fleet management system.

15. The first image capture apparatus of claim 9, wherein the first image capture apparatus further reports a location of the first image capture apparatus to the processing service.

16. The first image capture apparatus of claim 15, wherein the trigger is received based on the reported location of the first image capture apparatus.

17. A non-transitory computer readable medium for storing program instructions, which, when executed by a processor of a first image capture apparatus, cause the first image capture apparatus to:
receive, at the first image capture apparatus, from a second image capture apparatus a trigger to begin image capture, wherein the trigger includes a field indicating a range around the second image capture apparatus for which image capture data is needed and a location of the second image capture apparatus;
determine, by the first image capture apparatus, its location;
find, by the first image capture apparatus, whether the first image capture apparatus is within the range around the second image capture apparatus based on the location of the second image capture apparatus;
if the first image capture apparatus is within the range, start the image capture; and
provide image capture data to a processing service.

* * * * *